United States Patent [19]
Gross et al.

[11] Patent Number: 4,966,922
[45] Date of Patent: Oct. 30, 1990

[54] DUAL CURABLE SILICONE COMPOSITIONS

[75] Inventors: David C. Gross, Schenectady; Gary M. Lucas, Scotia, both of N.Y.

[73] Assignee: General Electric Company, Waterford, N.Y.

[21] Appl. No.: 204,655

[22] Filed: Jun. 9, 1988

[51] Int. Cl.$^5$ .............................................. C08G 77/08
[52] U.S. Cl. ...................................... 522/25; 522/29; 522/99; 528/34
[58] Field of Search ............................ 522/25; 528/34

[56] References Cited

U.S. PATENT DOCUMENTS

| | | | |
|---|---|---|---|
| 4,058,401 | 11/1977 | Crivello | 522/25 |
| 4,486,504 | 12/1984 | Chung | 522/25 |
| 4,490,416 | 12/1984 | Westall et al. | 528/34 |
| 4,528,081 | 7/1985 | Lien et al. | 522/40 |

Primary Examiner—John C. Bleutge
Assistant Examiner—Susan Berman

[57] ABSTRACT

A silicone polymer substituted with both hydrolyzable leaving groups and epoxy groups is catalyzed with condensation cure catalyst and onium salt photoinitiator to produce a dual curable composition.

13 Claims, No Drawings

DUAL CURABLE SILICONE COMPOSITIONS

The present invention relates to dual curable silicone compositions. More particularly, the present invention relates to silicone compositions curable by both exposure to UV light and to atmospheric moisture.

BACKGROUND OF THE INVENTION

Silicone polymers have found increasing utility in a variety of applications. Resistance to high temperature, UV light stability, low temperature flexibility and dielectric strength are all properties of silicone polymers which contribute to this trend. Notably, silicone polymers are employed as coatings, for example as release coatings or paints; as sealants, for example in construction expansion joints or in automotive; as potting compounds for electronic components; as gaskets; etc.

Moisture cured silicone polymers find the greatest utility in terms of volume use. Generally, these silicone polymers are applied and simply allowed to cure by diffusion of atmospheric moisture into the polymer. Understandably, under these cure conditions, minutes to hours are required before the moisture cured silicone polymer is "tack free", that is, sufficiently cured on the surface to permit further contact. Days are required before any but a thin layer of moisture cured silicone polymer is cured throughout.

One method to speed cure time of moisture cured silicone polymers is to incorporate a source of water immediately before application. With this method, mass transfer hinderances of water from the atmosphere onto the surface and into the bulk of silicone polymer is considerably reduced. Likewise, tack free time and cure times are also much reduced. However, a mixing step before application is required and while tack free time is reduced, it is still considerable for some applications.

U.S. Pat. No. 4,528,081 to Lien, et al., produces a moisture cured silicone polymer which is substituted with acrylic groups and is mixed with a photocatalyst. Thus, the composition therein can be rendered tack free with brief exposure to UV light and continue curing as a moisture cured silicone polymer. One drawback to this dual curable composition is the oxygen inhibition of acrylic groups under UV light exposure.

It is an object of the present invention to produce a dual curable silicone polymer composition.

It is yet another object of this invention to produce a dual curable composition of moisture cured silicone polymer utilizing UV light sensitive epoxy groups.

It is still another object of the present invention to produce a dual curable composition exhibiting no oxygen inhibition.

SUMMARY OF THE INVENTION

Briefly there is provided by the present invention a dual curable composition sensitive both to UV light exposure and hydrolytic conditions comprising (A) a dual curable silicone polymer of the empirical formula:

$$R_a R_b^1 R_c^2 SiO_{(4-a-b-c)/2} \tag{1}$$

wherein R is hydrogen or a substituted or unsubstituted $C_{(1-18)}$ hydrocarbon, $R^1$ is or contains a hydrolyzable leaving group, $R^2$ is a $C_{(1-18)}$ epoxy functional substituted or unsubstituted hydrocarbon, "a" is 0 to about 2, "b" is 0.001 to about 2, "c" is 0.001 to about 1, and a+b+c is from about 1 to about 3; (B) a catalytic amount of onium salt photocatalyst; and (C) a catalytic amount of condensation cure catalyst.

DETAILED DESCRIPTION OF THE INVENTION

The dual curable silicone polymer within the empirical formula (1) comprises a variety of siloxane units. The nature of the various siloxane units can be altered to render the silicone polymer as either a fluid, gum, or resin, as where various mixtures and ratios of mono-, di-, tri- and quadrifunctional siloxane units are employed. Further, within empirical formula (1) the value of "b" can be controlled to adjust polymer cure sensitivity to hydrolytic conditions as the value of "c" can be controlled to adjust polymer cure sensitivity to UV light.

As stated, the nature of the units controls the nature of the silicone polymer. A fluid or gum is substantially linear and might contain units such as: $R^2R_2SiO_{\frac{1}{2}}$ units, $R_2^1SiO_{2/2}$ units, and $R_2SiO_{2/2}$ units; $R_2^1R^2SiO_{\frac{1}{2}}$ and $R_2SiO_{2/2}$ units; $R_2^1R^2SiO_{\frac{1}{2}}$ units; or $R_3SiO_{\frac{1}{2}}$ units, $RR^1SiO_{2/2}$ units, and $RR^2SiO_{2/2}$ units. A resin might contain units such as: $R^1R^2SiO_{2/2}$ units and $RSiO_{3/2}$ units; $R_2R^2SiO_{\frac{1}{2}}$ units, $RR_2^1SiO_{\frac{1}{2}}$ units, and $SiO_{4/2}$ units; $R_2^1R^2SiO_{\frac{1}{2}}$ units, $R_2SiO_{2/2}$ units, and $SiO_{4/2}$ units; or $R_2^1SiO_{2/2}$ units and $R^2SiO_{3/2}$ units.

The relative proportions of the various units and the "R" group content thereof should be calculated to achieve the purpose for which the unit is present. There should be sufficient hydrolyzable leaving groups, $R^1$, to provide for the desired cure under the given hydrolytic conditions. Likewise there should be sufficient epoxy functional hydrocarbon groups, $R_2$, to provide for cure or partial cure as desired with set UV exposure. Preferably "a" varies from about 1 to about 2, "b" should vary from about 0.005 to about 0.5 and "c" from about 0.005 to about 0.25.

Preferred placement of $R^1$ and $R^2$ on the dual curable silicone polymer as well as the value of "b" and "c" is related to end use. An elastomeric composition has relatively long freely moving linear segments. Thus $R^1$ and $R^2$ should be placed on terminal siloxane units of a linear chain in a structure such as $R_2^1R^2SiO_{\frac{1}{2}}$ or $[R_2R^2SiO]R_2^1SiO_{\frac{1}{2}}$. In this instance the value of "b" and "c" is relatively low. A coating has relatively short silicone segments with a relatively high crosslink density. Thus, dual curable silicone polymers should be employed with $R^1$ and $R^2$ distributed along the entire molecular structure. In this instance the value of "b" and "c" might be within the preferred range. Further, dual curable fluids such as the silicone dimer $R_2^1R^2Si$-$OSiR^2R_2^1$ might be employed as a crosslinking agent for larger polymers and will have very high values of "b" and "c". Thus, intended use heavily influences the structure and molecular weight of the dual curable polymer. However, as an integral part of the dual curable composition herein, the dual curable polymer need contain sufficient $R^1$ and $R^2$ to allow for desired cure in the presence of onium salt photocatalyst and condensation cure catalyst.

In one embodiment of the dual curable silicone polymer herein, both $R^1$ and $R^2$, are attached to the same siloxane unit. Such polymers contain units of the formula $$R_A R_B^1 R_C^2 SiO_{(4-A-B-C)/2} \tag{2}$$

where R, $R^1$ and $R^2$ are known, "A" is 0 or 1, "B" is 1 or 2, "C" is 1 or 2 and $A+B+C=2$ or 3. Polymers containing these units may prove more easily synthesized.

Preferred silicone polymers herein are linear and have a viscosity ranging from about 10 to about 10,000,000 centipoise at 25° C. Such polymers are conveniently employed in coatings and sealants where it may be desirable to partially cure with UV light. For various reasons linear polymers containing $R_2SiO_{2/2}$ units and $R_c^1R_d^2SiO$ units where $c+d=3$ are preferred.

R above is defined as a hydrogen or $C_{(1-18)}$ substituted or unsubstituted hydrocarbon. Among the radicals included within R are alkyl such as methyl, ethyl and propyl; cycloalkyl such as cyclopentyl, cyclohexyl and cycloheptyl; aryl such as phenyl, naphthyl, tolyl and xylyl; aralkyl such as phenylethyl and phenylpropyl; substituted radicals of any of the foregoing, for example halogen substituted and cyanoalkyl substituted; and alkenyl, such as vinyl or allyl. Preferably R is hydrogen or a $C_{(1-18)}$ alkyl or aryl.

$R^1$ is described as a hydrolyzable leaving group or as containing a hydrolyzable leaving group. Accordingly, where $R^1$ is a hydrolyzable leaving group, $R^1$ includes any group which will hydrolyze in the presence of water to leave a hydroxy function. Preferred hydrolyzable leaving groups are those most commonly employed which are alkoxy, such as methoxy, propoxy octyloxy, etc., and acyloxy such as acetoxy, etc. However, other known hydrolyzable leaving groups are also known. These groups include amido, amino, carbamato, enoxy, imidato, isocyanato, oximato, thioisocyanato, and ureido. These hydrolyzable leaving groups are well known. Other than alkoxy and acetoxy, $R^1$ is generally a mixture of the above groups. Further teaching as to such groups may be found in U.S. Pat. No. 4,395,526, to White, et al., hereby incorporated by reference. Where $R^1$ contains a hydrolyzable leaving group, it might be characterized as a hydrolyzable leaving group substituted with a divalent hydrocarbon group, to produce a monovalent moiety. Examples of this type of $R^1$ include those of the general formula $R^{14}-Si(R^{15})_wR_{(4-w)}$ where $R^{14}$ is a divalent substituted or unsubstituted hydrocarbon radical, $R^{15}$ is a hydrolyzable leaving group, R is given above, and w is 1, 2 or 3. Specifically, $R^1$ might be ethylenetrimethoxysilane, propylenetriacetoxysilane, butylenetrisketoximosilane, etc.

$R^2$ is described above as a $C_{(1-18)}$ epoxy functional substituted or unsubstituted hydrocarbon. It is essential that the epoxy function be capable of reaction with other epoxy functions with exposure to UV light in the presence of onium salt photocatalysts. Any epoxy function meeting this requirement is suitable including glycidyl epoxy, but the preferred epoxy function is a cycloaliphatic epoxy, especially a cyclohexyl epoxy function. $R^2$ must be stable under hydrolytic conditions, thus it should be joined to the silicone atom of the silicone unit by an Si-C bond. This bond is practically formed by either a hydrosilation reaction or by a Grignard reaction. Further, $R^2$ may contain amine units where an amidization reaction is utilized to attach an epoxy functional carboxylic acid to an amine functional silicone unit. Likewise, $R^2$ may contain an ester group or a thioether group.

The nature of $R^2$ might be better understood by referring to the method to produce the dual curable silicone polymer below. Otherwise $R^2$ includes functional groups represented by the formula:

$$-R^5-Q_d-R^E$$

where $R^5$ is a $C_{(1-16)}$ substituted or unsubstituted hydrocarbon, Q is silicone ether, amide, ester, thioether or imide, $R^E$ is a $C_{(2-16)}$ substituted or unsubstituted epoxy functional hydrocarbon, and "d" is 0 or 1. Suitable $R^E$ include simple epoxy and cycloaliphatic epoxy.

The dual curable silicone polymer is produced by any of several methods. A base polymer might first be formed which contains suitable base functional groups appropriately situated to react with epoxy functional groups and hydrolyzable leaving groups to produce $R^2$ and $R^1$ respectively, in situ. However, it is preferred herein to avoid in situ production and to instead form $R^1$ and $R^2$ on one or more functional silanes which may be subsequently co-condensed without more but preferably with other silanes and/or endcapped to silanol polymer.

Formation of groups such as $R^1$ and $R^2$ on silanes is well understood. To form the hydrolyzable leaving group, $R^1$, on a silane, a chlorosilane is generally reacted with the appropriate organic alcohol to form alkoxy, with the appropriate organic acid to form acyloxy, with the appropriate amine to form amino, etc. The formation of $R^2$ can be as simple as a hydrosilation reaction between an unsaturated epoxy and an Si-H group or a Grignard reaction between an organic magnesium halide and a chlorosilane. Alternatively, $R^2$ can be produced in a multi-step process where a reactive group such as an organic amine or organic alcohol, etc. is first substituted to a silane by hydrosilation reaction or Grignard reaction followed by amidization or esterification, etc., to attach the epoxy function. $R^2$ is preferably formed by hydrosilation of an unsaturated epoxy to an Si-H group. Suitable unsaturated epoxy include allyl glycidyl ether, 4-vinylcyclohexeneoxide, 1-butene-3,4-epoxide, etc.

Functional silanes for use herein containing both $R^1$ and $R^2$ are characterized by the general formula:

$$R_AR_D^1R_C^2Si \qquad (3)$$

where R is hydrogen or a substituted or unsubstituted $C_{(1-12)}$ hydrocarbon, $R^1$ is a hydrolyzable leaving group, $R^2$ is a $C_{(1-18)}$ epoxy functional hydrocarbon, "A" is 0 or 1, "D" is 2 or 3, "C" is 1 or 2, and $A+D+C$ is 4. Suitable such silanes include:
gamma-glycidoxypropyltriethoxysilane,
4,5-epoxypentatriethoxysilane,
gamma-glycidoxypropyltributoxysilane,
omega-glycidoxybutyltriethoxysilane,
gamma-glycidoxypropyltripropoxysilane,
gamma-glycidoxypropyltrimethoxysilane,
omega-glycidoxyhexyltriethoxysilane,
omega-glycidoxyoctyltriethoxysilane,
omega-glycidoxyhexyltributoxysilane,
glycidoxy-o,p-phenyltriethoxysilane,
5,6-epoxyhexyltrimethoxysilane,
5,6-epoxyhexyltributoxysilane,
7,8-epoxyoctyltrimethoxysilane,
7,8-epoxyoctyltripropoxysilane,
9,10-epoxydecyltrimethoxysilane,
9,10-epoxydecyltripropoxysilane,
beta-3,4-(epoxycyclohexyl)ethyltrimethoxysilane,
beta-3,4-(epoxycyclohexyl)propyltributoxysilane, and the like.

As stated, the dual curable silicone polymer is preferably produced by co-condensing functional silanes having $R^1$ and/or $R^2$ functions with other silanes and/or with silanol polymer. Thus, to produce particularly useful linear dual curable silicone polymer, a functional silane of formula (3) is co-condensed with a dialkoxy silane or endcapped to hydroxy stopped polydiorganosiloxane of the formula:

$$HO\text{—}(R_2SiO)_x\text{—}H \quad (4)$$

where "x" is selected to produce a viscosity between about 10 and about 10,000,000 centipoise at 25° C. and R is given above.

The co-condensation reaction of silanes and/or endcapping of silanes to silanol polymer is well known. For example, alkoxysilanes including those of formula (3) may be co-condensed by heating in the presence of water and hydrochloric acid. The molecular weight of the dual curable silicone polymer is controlled in this case by temperature, heating time, acidity and water concentration displacing hydrolyzable groups. Also, hydroxy stopped polydiorganosiloxane as shown in formula (4) can be endcapped with alkoxysilane, for example of formula (3), by simply mixing anhydrously with an effective amount of condensation catalyst. In this instance, molecular weight is controlled by hydroxy stopped polydiorganosiloxane component.

One example of the co-condensation reaction is disclosed in U.S. Pat. No. 4,515,932, to Chung, which is incorporated by reference.

The onium salt photocatalysts are well known, particularly for use with epoxy functional materials. Generally the onium salt photocatalysts may be divided into three classes, namely the halonium photocatalysts, the sulfonium photocatalysts, and the phosphonium photocatalysts.

The halonium salts are represented by the general formula:

$$[(R^6)_e(R^7)_fX]_g^+ \ [MQ_h]^{-(h-i)}$$

where $R^6$ is a monovalent aromatic organic radical; $R^7$ is a divalent aromatic organic radical; X is a halogen, such as I, Br, Cl, etc.; M is a metal or a metalloid; Q is a halogen radical, such as Cl, F, Br, I, etc.; e is a whole number equal to 0 or 2; f is a whole number equal to 0 or 1; e+f =2 or the valence of X; g =h−i; i is the valence of M and is an integer from 2 to 7 inclusive; and h is greater than i and has a value up to and including 8. Preferred halonium salts are iodonium salts and are exemplified by 3-methoxyphenyl-phenyl-phenyl-I+ $BF_4^-$, 2-nitrophenyl—phenyl—I+ $BF_4^-$, $(C_{12}H_{25-phenyl})_2I^+SbF_6^-$, etc. The halonium salts are well known and are discussed further in U.S. Pat. No. 4,026,705 and 3,981,897, hereby incorporated by reference.

Similarly the sulfonium salts are represented by the general formula:

$$[(R^8)_j(R^9)_k(R^{10})_lX']_m^{30} \ [M'Q'_n]^{-(m-p)}$$

where $R^8$ is a monovalent aromatic organic radical; $R^9$ is a monovalent organic aliphatic radical selected from alkyl, cycloalkyl, and substituted alkyl; $R^{10}$ is a polyvalent organic radical forming a heterocyclic or fused ring structure selected from aliphatic radicals and aromatic radicals; X' is a group VIa element selected from sulfur, selenium and tellurium; M' is a metal or metalloid; Q' is a halogen radical, j is a whole number of 0, one, 2 or 3; k is a whole number of 0, one or 2; l is a whole number of 0 or one ; j+k+l=3 or the valence of X; m =n−p; p is the valence of M' and is an integer of from 2 to 7 inclusive; and n is greater than p and is an integer having a value up to 8. Consistent with the name given herein, it is preferred that X' be sulfur. Suitable sulfonium salts include triphenyl−S+ $SbF_6^-$,; 4-thiophenoxyphenyl-diphenyl-S+ $SbF_6^-$, tricyclodiphenylenephenyl-S$^{30}$ $BF_4^-$, benzoylmethyl-cyclo-butylene S+ $PF_6^-$. Further sulfonium salts are disclosed in U.S. Pat. No. 4,161,478, hereby incorporated by reference.

The phosphonium salts may be represented by the formula:

$$[(R^{11})_q(R^{12})_r(R^{13})_sX'']_t^{30} \ [M''Q''_u]^{-(u-v)}$$

where $R^{11}$ is a monovalent aromatic organic radical selected from carbocyclic radicals and heterocyclic radicals; $R^{12}$ is a monovalent organic aliphatic radical selected from alkyl, alkoxy, cycloalkyl and substituted derivatives thereof; $R^{13}$ is a polyvalent organic radical forming an aromatic heterocyclic or fused ring structure with X''; X'' is a group Va element selected from N, P, As, Sb, and Bi; M'' is a metal or metalloid; Q'' is a halogen radical; q is a whole number equal to 0 to 4 inclusive; r is a whole number equal to 0 to 2 inclusive; s is a whole number equal to 0 to 2 inclusive; q+r+s is a value equal to 4 or the valence of X''; t=u−v; v is the valence of M'' and is an integer of from 2 to 7 inclusive; and u is greater than v and is an integer having a value up to 8. X'' is preferably phosphorus as understood from the term phosphonium salt. Phosphonium salts are represented by, for example, tetraphenyl-P+ $BF_4^-$, triphenyl-benzoylmethyl-P+ $AsF_6^-$, dimethyl-phenyl-benzoylmethyl-N+ $BF_4^-$. Phosphonium salts are further described in U.S. Pat. No. 4,069,055, hereby incorporated by reference.

Dye sensitizers to increase the effectiveness of the photocatalyst are understood to generally function by absorbing light of a spectrum which has little or no effect on the catalyst and releasing the absorbed light in a form to effect the photocatalyst. Thus, the use of the dye sensitizer results in better utilization of the energy available from the light source. Dyes which can be used in combination with the above described onium salts are cationic dyes, such as shown in Vol. 20, p. 194–7of the Kirk-Othmer Encyclopedia, 2nd Edition, 1965, John Wiley & Sons, New York. Some of the cationic dyes which can be used are, for example, Acridine orange; C.I. 46005;
Acridine yellow; C.I. 46035;
Phosphine R; C.I. 46045;
Benzoflavin; C.I. 46065;
Setoflavin T; C.I. 49005.

In addition to the above, basic dyes can also be used. Some of these basic dyes are shown in Vol. 7, p. 532–4 of Kirk-Othmer Encyclopedia, as cited above, and include:

Hematoporphyrin;
4,4'-bisdimethylaminobenzophenone and
4,4'-bisdiethylaminobenzophenone.

Also, suitable are xanthones, such as thioxanthone, 2-isopropyl thioxanthone, and aminoxanthene. Specific instances where dye sensitizers are employed as detailed in U.S. Pat. No. 4,026,705 hereby incorporated by reference.

Condensation cure catalysts are well known. These catalysts are metal complexes of tin, titanium, aluminum, zinc, zirconium, etc. or Bronsted acids of nonmetal compounds such as acetic acid, ammonium carboxylates, etc.

Tin compounds which may be used are, for example, dibutyltindilaurate; dibutyltindiacetate; dibutyltindimethoxide; carbomethoxyphenyl tin trisuberate, tin octoate; isobutyl tin triceroate; dimethyl tin dibutyrate; dimethyl tin di-neodecanoate; triethyl tin tartrate; dibutyl tin dibenzoate; tin oleate; tin naphthenate; butyltintri-2-ethylhexoate; tinbutyrate. The preferred condensation catalysts are tin compounds and dibutyltindacetate is particularly preferred.

Titanium compounds which can be used are, for example, 1,3-propanedioxytitanium bis(ethylacetoacetate); 1,3-propanedioxytitanium bis(acetylacetonate); diisopropoxytitanium bis(acetylacetonate); titanium naphthenate; tetrabutyltitanate; tetra-2-ethylhexyltitanate; tetraphenyltitanate; tetraoctadecyltitanate; ethyltriethanolaminetitanate. In addition beta-dicarbonyltitanium compounds as shown by Weyenberg U.S. Pat. No. 3,334,067 can be used as condensation catalysts in the present invention.

Zirconium compounds, for example, zirconium octoate, also can be used.

Further examples of metal condensation catalysts are, for example, lead 2-ethyloctoate; iron 2-ethylhexoate; cobalt 2-ethylhexoate; manganese 2-ethylhexoate; zinc 2-ethylhexoate; antimony octoate; bismuth naphthenate; zinc naphthenate; zinc stearate.

Examples of nonmetal condensation catalysts are hexylammonium acetate and benzyltrimethylammonium acetate.

The dual curable silicone polymer is easily blended into dual curable compositions. The preformed polymer may be simply blended with onium salt photocatalyst and condensation cure catalyst. Alternatively hydroxy stopped polydiorganosiloxane may be mixed with dual functional silane, condensation cure catalyst and onium salt photocatalyst to both form the dual curable polymer and the dual curable composition simultaneously. Of the onium salt photocatalyst, there is generally required from about 0.1% to about 10% by weight based on the dual curable composition optionally in combination with 0.01% to 1.5% by weight based on total composition of dye sensitizer. Of the condensation cure catalyst there is generally required from about 0.001 to 1% by weight based on the dual curable composition.

Of course, the dual curable composition would have limited utility without a variety of additives to enhance properties for particular applications. Additional crosslinking agents, pigments, extending fillers, reinforcing fillers, thixotropic agents, methanol scavengers, adhesion promoters, UV stabilizers may all be employed herein. The amount of each and its appropriate use is well known to the skilled artisan.

As an additive, epoxy functional organic compounds are commonly utilized in epoxy functional organopolysiloxanes and onium salt photocatalyst compositions as a crosslinking agent and to modify adhesion. These epoxy functional organic compounds include limoneneoxide, 4-vinylcyclohexeneoxide, allylglycidyl ether, 7-epoxy-1-octene, vinylcyclohexenedioxide, bis(2,3-epoxycyclopentyl)ether, 3,4-epoxycyclohexylmethyl-3,4-epoxycyclohexanecarboxylate, cresylglycidyl ether, butanedioldiglycidly ether and the like. Mixtures of such epoxides are also suitable. These compounds may also be useful as reactive diluents.

Another additive in a similar vein might be silanes containing hydrolyzable groups. Again, such silanes act to increase crosslink density, modify adhesion and to act as a methanol scavenger. These silanes are exemplified by methyltrimethoxy silane, gamma-aminopropyltrimethoxysilane, methyldimethoxyaminosilane, methyltriacetoxysilane and vinyltriacetoxysilane.

Where the reinforcing filler is employed as a sealant or caulking compound, it should contain a filler. The exact amount of filler will depend upon such factors as the application for which the dual curable composition is intended and the type of filler utilized including the density of the filler and its particle size. Preferably a proportion of from 10 to 300 parts of filler which can include up to 100 parts reinforcing filler, such as fumed silica, per 100 parts dual curable silicone composition is utilized.

The dual curable composition herein can be used or applied as any other composition of its formulated type. Thus, formulated as a coating, or a sealant, or a potting compound, the dual curable composition can be employed as any other moisture curing composition. The clear advantage herein is that the dual curable composition can be rendered partially cured or tack free with exposure to UV light. This property is of tremendous advantage on assembly lines, for instance, where a tacky coating can interfere with subsequent assembly. Final cure takes place with simple exposure to atmospheric moisture.

In order that those skilled in the art might be better able to practice the present invention, the following examples are provided by way of illustration and not by way of limitation. All parts are in parts by weight.

EXAMPLES

Example 1

A mixture of silanol terminated polydimethylsiloxane fluid (100 g, 0.14% OH, 570 cps), 2-(3,4-epoxycyclohexyl)ethyltrimethoxysilane (ECHETMS) (9.43 g, 0.041 moles), and [(n-butyl)$_2$NH$_2$][O$_2$CH] (0.123 g 0.000702 moles), present as a 50 wt. % solution in toluene) were added to a 500 ml 3-necked round bottom flask equipped with an overhead stirrer. This solution was heated to 60° C. for approximately 30 minutes. A viscosity increase to 650 cps was measured. No further viscosity increase was observed upon addition of (i-PrO)$_4$Ti indicating that an endcapped polymer had been formed. A $^{29}$Si NMR spectrum showed no evidence of free silanol and a resonance at −49 ppm which can be assigned to the 2-(3,4-epoxycyclohexyl)ethyldimethoxysilyl endgroup. Furthermore, a $^{13}$C NMR spectrum revealed that the epoxide group had remained intact during the endcapping.

Example 2

A resin kettle containing silanol terminated polydimethylsiloxane fluid (1500 g, 1900 cps) was preheated to 80° C. Two catalyst solutions were added in succession, the first containing 27 g of ECHETMS and 1.1 g of (i-Bu)$_2$NH, the second containing 27 g of ECHETMS and 0.39 g of HCO$_2$H. The contents were stirred at 80° C. for 1 hour and allowed to cool overnight. The following morning a 3900 cps viscosity reading was obtained. Complete endcapping was evidenced by an absence of gelation upon mixing 100 g of this polymer (Polymer 2) with 0.2 g of (i-PrO)$_4$Ti.

Example 3

A Baker-Perkins mixer was employed to prepare an RTV base comprised of 100 g of Polymer A (Example 2), octamethylcyclotetrasiloxane (D$_4$) treated fumed silica (188 g), trimethylsilyl terminated polydimethylsiloxane plasticizing fluid (100 cps, 166 g), and an "MDT" siloxane fluid (55 g, 0.3% silanol). An MDT siloxane fluid is a silicone made up of monofunctional, difunctional, and trifunctional siloxane units. This base was loaded into Semco tubes (150 g) which were catalyzed individually with methyltrimethoxysilane (MTMS), an iodonium salt, and, in some cases, Bu$_2$Sn(OAc)$_2$, a moisture cure catalyst. The contents of RTVs 1–4 is shown is Table 1. Each of these sealants became tack free upon exposure to UV light in the presence of oxygen. However, only the RTVs which contain a moisture cure catalyst, 3 and 4, cured to give a translucent elastomer whether or not the photochemical process was employed.

The physical properties of RTV 3 and RTV 4 are shown in Table 2.

TABLE 1

| | Dual Curable Silicone Elastomers | | | |
|---|---|---|---|---|
| RTV | 1 | 2 | 3 | 4 |
| Polymer A (pbw) | 70.9 | 71.5 | 71.4 | 71.3 |
| Fumed Silica (pbw) | 11.7 | 11.8 | 11.7 | 11.7 |
| Plasticizer (pbw) | 10.7 | 10.8 | 10.8 | 10.7 |
| MDT siloxane fluid | 3.5 | 3.5 | 3.5 | 3.5 |
| (C$_{12}$H$_{25}$Ph)$_2$I$^+$SbF$_6^-$ (pbw) | 0.0 | 0.96 | 0.97 | 0.96 |
| PhI$^+$(PhOC$_8$H$_{17}$) SbF$_6^-$(pbw) | 0.97 | 0.0 | 0.0 | 0.0 |
| MTMS (pbw) | 0.98 | 1.1 | 0.99 | 1.0 |
| Bu$_2$Sn(OAc)$_2$ (pbw) | no | no | yes | yes |
| Moisture Effected Tack free time (min) | no cure | no cure | 120 | 60 |
| Photochemical tack free time (mJ/cm$^2$) | 200 | 480 | 1500 | 2000 |

In Table 1 above, "no" refers to the absence of Bu$_2$Sn(OAc)$_2$, and "yes" refers to the presence of Bu$_2$Sn(OAc)$_2$.

Example 4

A mixture of 1,1,3,3-tetramethyldisiloxane (TMDS, 48 g, 0.38 moles), toluene (50 g), and Pt in the form of Karstedt's catalyst (Pt[((CH$_2$=CH)Me$_2$Si)$_2$O]$_2$, 0.00024 g Pt) were combined in a 500 ml 3-necked round bottom flask and heated to 70° C. An addition funnel was employed to add vinyltriacetoxysilane (44 g, 0.19 moles) dropwise over a two hour period. At this time 4-vinylcyclohexeneoxide (0.6 moles, 73.3 g) was added dropwise while the reaction temperature was maintained at 70° C. overnight. The following morning the toluene and excess 4-vinylcyclohexeneoxide were stripped by rotovap leaving a pale yellow liquid consisting primarily of

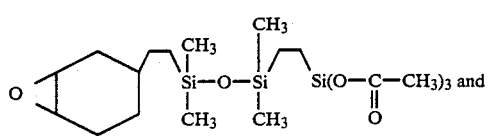

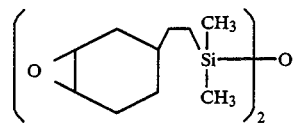

A sealant, shown in Table 2 as RTV #5, was formulated by adding 0.55 parts by weight of C$_{12}$H$_{25}$Ph)$_2$I$^+$SbF$_6^-$ to 5.5 pbw of this mixture of disiloxanes plus 70 pbw of silanol terminated polydimethylsiloxane (23,500 cps), 10 pbw of an "MDT" siloxane fluid (0.3% silanol), and 14 pbw of D$_4$ treated fumed silica. A tack free surface was obtained in the presence of O$_2$ upon exposure to a UV flux of less than 3,000 mJ/cm$^2$. Alternatively, atmospheric moisture induced a tack free surface in 20 minutes time.

TABLE 2

| | Physical Properties | | | | |
|---|---|---|---|---|---|
| RTV | 3 | 4 | 4 | 5 | 5 |
| Exposure to 6000 mJ/cm$^2$ UV flux | yes | no | yes | no | yes |
| Shore A | 14 | 16 | 19 | 31 | 23 |
| Tensile (p.s.i) | 92 | 155 | 93 | 398 | 400 |
| Elongation (%) | 140 | 214 | 131 | 327 | 333 |
| Modulus (p.s.i. @ 50, 100 and 150% elongation) | 34-59-98 | 35-58-92 | 37-66 | 53-81-123 | 45-73-116 |

Physical properties measured after 7 days at 50% relative humidity

What is claimed is:

1. A composition comprising
   (A) a dual curable silicone polymer containing units of the formula:

$R_A R_B^1 R_C^2 SiO_{(4-A-B-C)/2}$ wherein R is hydrogen or a substituted or unsubstituted C$_{(1-18)}$ hydrocarbon; R$^1$ is or contains a hydrolyzable leaving group; R$^2$ is a C$_{(1-18)}$ epoxy functional substituted or unsubstituted hydrocarbon; "A" is 0 or 1, "B" is 1 or 2, "C" is 1 or 2 and A+B+C is 2 or 3;
   (B) a catalytic amount of onium salt photocatalyst; and
   (C) a catalytic amount of condensation cure catalyst; wherein the silicone polymer is prepared by reacting in the presence of dibutylammonium formate (1) a functional silane having the formula:

$R_A R_D^1 R_C^2 Si$ wherein R is hydrogen or a substituted or unsubstituted C$_{(1-18)}$ hydrocarbon, R$^1$ is a hydrolyzable leaving group, R$^2$ is a C$_{(1-18)}$ epoxy functional hydrocarbon, A is 0 or 1, D is 2 or 3, C is 1 or 2, and A+D+C is 4; and
   (2) is hydroxy stopped polydiorganosiloxane of the formula:

$HO—(R_2SiO)_x—H$ wherein x is selected to produce a viscosity between about 10 and about 10,000,000 centipoise at 25° C. and R is hydrogen or substituted or unsubstituted C$_{(1-18)}$ hydrocarbon.

2. The composition of claim 1 wherein said dual curable silicone polymer is linear having terminal siloxane units of the formula $$R_2^1R^2SiO_{1/2} \text{ or}$$

$$[R_2R^2SiO]R_2^1SiO_{1/2}$$

3. The composition of claim 1 wherein said $R^1$ is independently, alkoxy, acyloxy, amide, amino, carbamato, enoxy, imidato, isocyanato, oximato, thioisocyanato or ureido.

4. The composition of claim 1 wherein said $R^2$ is glycidyl or cyclohexyl epoxy.

5. The composition of claim 1 wherein $R^2$ is joined to said dual curable silicone polymer by an Si-C bond.

6. The composition of claim 1 wherein $R^2$ has the formula:

$$-R^5-Q_d-R^E$$

where $R^5$ is a $C_{(1-16)}$ substituted or unsubstituted hydrocarbon, Q is siloxane, ether, amide, ester, thioether, or imide, $R^E$ is a $C_{(2-16)}$ substituted or unsubstituted epoxy functional hydrocarbon, and "d" is 0 or 1.

7. The composition of claim 1 wherein said dual curable silicone polymer is the endcapping reaction product of $$HO-(R_2SiO)_X-H$$

where R is given above and "X" is selected to produce a viscosity of about 10 to about 10,000,000 centipoise, and $$R_AR_D^1R_C^2SiO$$

where R, $R^1$ and $R^2$ are given above, "A" is 0 or 1, "D" is 2 or 3, "C" is 1 or 2, and A+D+C is 4.

8. The composition of claim 1 wherein said dual curable silicone polymer is a fluid gum or resin.

9. The composition of claim 1 wherein said onium salt photocatalyst is halonium salt, sulfonium salt or phosphonium salt.

10. The composition of claim 1 wherein said onium salt photocatalyst is present in an amount of from about 0.1 to about 10% by weight based on dual curable composition.

11. The composition of claim 1 wherein said condensation cure catalyst is a tin compound, titanium compound or zirconium compound, or Bronsted acid.

12. The composition of claim 1 wherein said condensation cure catalyst is present in an amount of from about 0.001 to about 1% by weight based on dual curable composition.

13. A composition exposed to sufficient UV light to render the same tack free, said composition comprising:
(A) a dual curable silicone polymer containing units of the formula:

$$R_AR_B^1R_C^2SiO_{(4-A-B-C)/2}$$

wherein R is hydrogen or a substituted or unsubstituted $C_{(1-18)}$ hydrocarbon; $R^1$ is or contains a hydrolyzable leaving group; $R^2$ is a $C_{(1-18)}$ epoxy functional substituted or unsubstituted hydrocarbon; "A" is 0 or 1, "B" is 1 or 2, "C" is 1 or 2 and A+B+C is 2 or 3;
(B) a catalytic amount of onium salt photocatalyst; and
(C) a catalytic amount of condensation cure catalyst; wherein the silicone polymer is prepared by reacting in the presence of dibutylammonium formate (1) a functional silane having the formula:

$$R_AR_D^1R_C^2Si$$

wherein R is hydrogen or a substituted or unsubstituted $C_{(1-18)}$ hydrocarbon, $R^1$ is a hydrolyzable leaving group, $R^2$ is a $C_{(1-18)}$ epoxy functional hydrocarbon, A is 0 or 1, D is 2 or 3, C is 1 or 2, and A+D+C is 4; and (2) is hydroxy stopped polydiorganosiloxane of the formula:

$$HO-(R_2SiO)_x-H$$

wherein x is selected to produce a viscosity between about 10 and about 10,000,000 centipoise at 25° C. and R is hydrogen or substituted or unsubstituted $C_{(1-18)}$ hydrocarbon.

* * * * *